(12) United States Patent
Johnson et al.

(10) Patent No.: US 9,407,194 B2
(45) Date of Patent: Aug. 2, 2016

(54) SYSTEM AND METHOD FOR PROTECTION OF A COMPRESSOR WITH AN ALUMINUM WINDING MOTOR

(71) Applicant: Emerson Climate Technologies, Inc., Sidney, OH (US)

(72) Inventors: Jefferson B Johnson, Sidney, OH (US); Jeffrey John Hoying, Fort Recovery, OH (US); Anthony P. Motz, Laura, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 275 days.

(21) Appl. No.: 14/193,049

(22) Filed: Feb. 28, 2014

(65) Prior Publication Data

US 2014/0268433 A1    Sep. 18, 2014

Related U.S. Application Data

(60) Provisional application No. 61/791,330, filed on Mar. 15, 2013.

(51) Int. Cl.
*H02P 29/00* (2016.01)
*H02H 3/24* (2006.01)
(Continued)

(52) U.S. Cl.
CPC ............ *H02P 29/0055* (2013.01); *F04B 35/04* (2013.01); *F04B 39/06* (2013.01); *F04B 49/06* (2013.01); *F04B 49/10* (2013.01);
(Continued)

(58) Field of Classification Search
CPC .................................. H02P 29/00; H02H 3/24

USPC .................................................. 361/33, 23, 1
See application file for complete search history.

(56) References Cited

U.S. PATENT DOCUMENTS 3,324,371 A    6/1967 Stauffer
3,348,183 A   10/1967 Hodges et al.
(Continued)

FOREIGN PATENT DOCUMENTS

CN    2031175 U    1/1989
CN    1476151 A    2/2004
(Continued)

OTHER PUBLICATIONS

U.S. Appl. No. 13/835,087, filed Mar. 15, 2013.
(Continued)

*Primary Examiner* — Kawing Chan
(74) *Attorney, Agent, or Firm* — Harness, Dickey & Pierce, P.L.C.

(57) ABSTRACT

A compressor includes an electric motor and a protector device. The motor drives a compression mechanism and has a rotor and a stator. The stator includes aluminum windings. The protector device is attached to the stator and is configured to disconnect the motor from a power supply when an input voltage of the power supply to the motor is less than a threshold voltage value set at a level between a minimum run voltage and an overheat voltage of the compressor. The overheat voltage corresponds to an overheat temperature of the motor. The threshold voltage value is set at a level that is between the minimum run voltage and the overheat voltage. The protector device includes a tolerance level such that the threshold voltage minus the tolerance level is greater than the overheat voltage and the threshold voltage plus the tolerance level is less than the minimum run voltage.

15 Claims, 6 Drawing Sheets

(51) Int. Cl.

| | | |
|---|---|---|
| *F04B 35/04* | (2006.01) | |
| *F04B 39/06* | (2006.01) | |
| *F04B 49/06* | (2006.01) | |
| *F04B 49/10* | (2006.01) | |
| *H02P 25/04* | (2006.01) | |
| *F04C 23/00* | (2006.01) | |
| *F04C 28/28* | (2006.01) | |
| *F04C 29/00* | (2006.01) | |
| *F04C 18/02* | (2006.01) | |
| *H02H 7/085* | (2006.01) | |

(52) U.S. Cl.
CPC .............. *F04C 23/008* (2013.01); *F04C 28/28* (2013.01); *F04C 29/0085* (2013.01); *H02P 25/04* (2013.01); *F04B 2203/0202* (2013.01); *F04B 2203/0205* (2013.01); *F04C 18/0215* (2013.01); *F04C 2270/10* (2013.01); *H02H 3/24* (2013.01); *H02H 7/0852* (2013.01)

(56) References Cited

U.S. PATENT DOCUMENTS

| | | | |
|---|---|---|---|
| 3,421,034 A | 1/1969 | Hershberger | |
| 3,450,338 A | 6/1969 | Huttenlocher | |
| 3,488,569 A | 1/1970 | Allendorph et al. | |
| 3,515,919 A | 6/1970 | Houtman | |
| 3,528,171 A | 9/1970 | Houtman | |
| 3,942,055 A | 3/1976 | Hoffmeyer | |
| 4,035,910 A | 7/1977 | Kindig | |
| 4,100,444 A | 7/1978 | Boyd, Jr. | |
| 4,107,583 A | 8/1978 | Houtman | |
| 4,702,681 A | 10/1987 | Inaba et al. | |
| 4,880,391 A | 11/1989 | Hurtgen | |
| 5,319,844 A | 6/1994 | Huang et al. | |
| 5,753,989 A | 5/1998 | Syverson et al. | |
| 6,114,790 A | 9/2000 | Fei | |
| 6,194,805 B1 | 2/2001 | Heese et al. | |
| 6,257,840 B1 | 7/2001 | Ignatiev et al. | |
| 6,349,558 B1 | 2/2002 | Ichikawa et al. | |
| 6,544,009 B2 | 4/2003 | Makino et al. | |
| 6,617,746 B1 | 9/2003 | Maslov et al. | |
| 6,634,182 B2 | 10/2003 | Ichikawa et al. | |
| 6,708,520 B2 | 3/2004 | Yasunori et al. | |
| 6,984,909 B2 | 1/2006 | Kadoya et al. | |
| 7,081,734 B1 | 7/2006 | Jadric et al. | |
| 7,082,786 B2 | 8/2006 | Yasunori et al. | |
| 7,150,169 B2 | 12/2006 | Kim et al. | |
| 7,281,910 B2 | 10/2007 | Hasegawa | |
| 7,327,063 B2 | 2/2008 | Matsubara | |
| 7,511,401 B2 | 3/2009 | Yang et al. | |
| 7,638,920 B2 | 12/2009 | Niguchi et al. | |
| 7,709,992 B2 | 5/2010 | Hussey et al. | |
| 7,834,496 B2 | 11/2010 | Shin et al. | |
| 7,868,509 B2 | 1/2011 | Yoshino et al. | |
| 8,035,269 B2 | 10/2011 | Bottger et al. | |
| 8,102,093 B2 | 1/2012 | Prudham | |
| 8,148,870 B2 | 4/2012 | Iki et al. | |
| 8,222,788 B2 | 7/2012 | Rose | |
| 8,390,167 B2 | 3/2013 | Jung et al. | |
| 8,441,165 B2 | 5/2013 | Jung et al. | |
| 8,450,901 B2 | 5/2013 | Jung et al. | |
| 2004/0056557 A1 | 3/2004 | Enomoto et al. | |
| 2006/0049710 A1 | 3/2006 | Han et al. | |
| 2006/0116797 A1 | 6/2006 | Moran | |
| 2006/0279161 A1 | 12/2006 | Hitomi et al. | |
| 2008/0012438 A1 | 1/2008 | Hong | |
| 2009/0214363 A1 | 8/2009 | Noh et al. | |
| 2010/0026103 A1 | 2/2010 | Sabadie | |
| 2011/0033326 A1* | 2/2011 | Cao | F04C 18/0215 418/55.1 |
| 2012/0045353 A1* | 2/2012 | Watanabe | F04B 35/04 417/410.1 |

FOREIGN PATENT DOCUMENTS

| | | |
|---|---|---|
| CN | 2650377 Y | 10/2004 |
| CN | 102522928 | 6/2012 |
| CN | 204068575 U | 12/2014 |
| EP | 1863148 A2 | 12/2007 |
| JP | 58189354 | 11/1983 |
| JP | 2000083339 A | 3/2000 |
| WO | 2008005408 A2 | 1/2008 |
| WO | 2008032942 A1 | 3/2008 |

OTHER PUBLICATIONS

Office Action regarding Chinese Patent Application No. 201410096448.8, dated Mar. 2, 2016. Translation provided by Unitalen Attorneys at Law.

* cited by examiner

SYSTEM AND METHOD FOR PROTECTION OF A COMPRESSOR WITH AN ALUMINUM WINDING MOTOR

CROSS-REFERENCE TO RELATED APPLICATIONS

This application claims the benefit of U.S. Provisional Application No. 61/791,330, filed on Mar. 15, 2013. The entire disclosure of the above application is incorporated herein by reference.

FIELD

The present disclosure relates to compressor motors and, more specifically, to a system and method for protection of a compressor with an aluminum winding motor.

BACKGROUND

This section provides background information related to the present disclosure which is not necessarily prior art.

Refrigeration and air conditioning systems generally include a compressor, a condenser, an expansion valve or its equivalent, and an evaporator. These components are coupled in sequence to define a continuous flow path. Refrigerant flows through the system and alternates between a liquid phase and a vapor or gaseous phase. A variety of compressor types have been used in refrigeration systems, including, but not limited to, scroll compressors, reciprocating compressors, screw compressors, and rotary compressors, such as vane type compressors.

In a scroll compressor, an electric motor drives one of the scroll members via a suitable drive shaft affixed to the motor rotor. Traditionally, compressor manufacturers have used copper windings in the electric motors. More recently, manufacturers of scroll compressors have transitioned to motors having a combination of copper windings with some aluminum windings. Aluminum windings, however, have a higher resistivity than copper. Thus, replacing too many of the copper windings with aluminum windings will cause a decrease in the efficiency of the motor.

SUMMARY

This section provides a general summary of the disclosure, and is not a comprehensive disclosure of its full scope or all of its features.

A compressor is provided and includes a single-phase electric motor and a protector device. The electric motor drives a compression mechanism and has a rotor and a stator. The stator is comprised of aluminum windings. The protector device is attached to the stator and is configured to disconnect the electric motor from a power supply when an input voltage of the power supply to the electric motor is less than a threshold voltage value set at a level between a minimum run voltage and an overheat voltage of the compressor. The overheat voltage corresponds to an overheat temperature of the electric motor. The threshold voltage value is set at a level that is between the minimum run voltage and the overheat voltage. The protector device includes a tolerance level such that the threshold voltage minus the tolerance level is greater than the overheat voltage and the threshold voltage plus the tolerance level is less than the minimum run voltage.

Further areas of applicability will become apparent from the description provided herein. The description and specific examples in this summary are intended for purposes of illustration only and are not intended to limit the scope of the present disclosure.

DRAWINGS

The present disclosure will become more fully understood from the detailed description and the accompanying drawings, wherein.

Corresponding reference numerals indicate corresponding parts throughout the several views of the drawings.

DETAILED DESCRIPTION

Example embodiments will now be described more fully with reference to the accompanying drawings.

Figure 1:
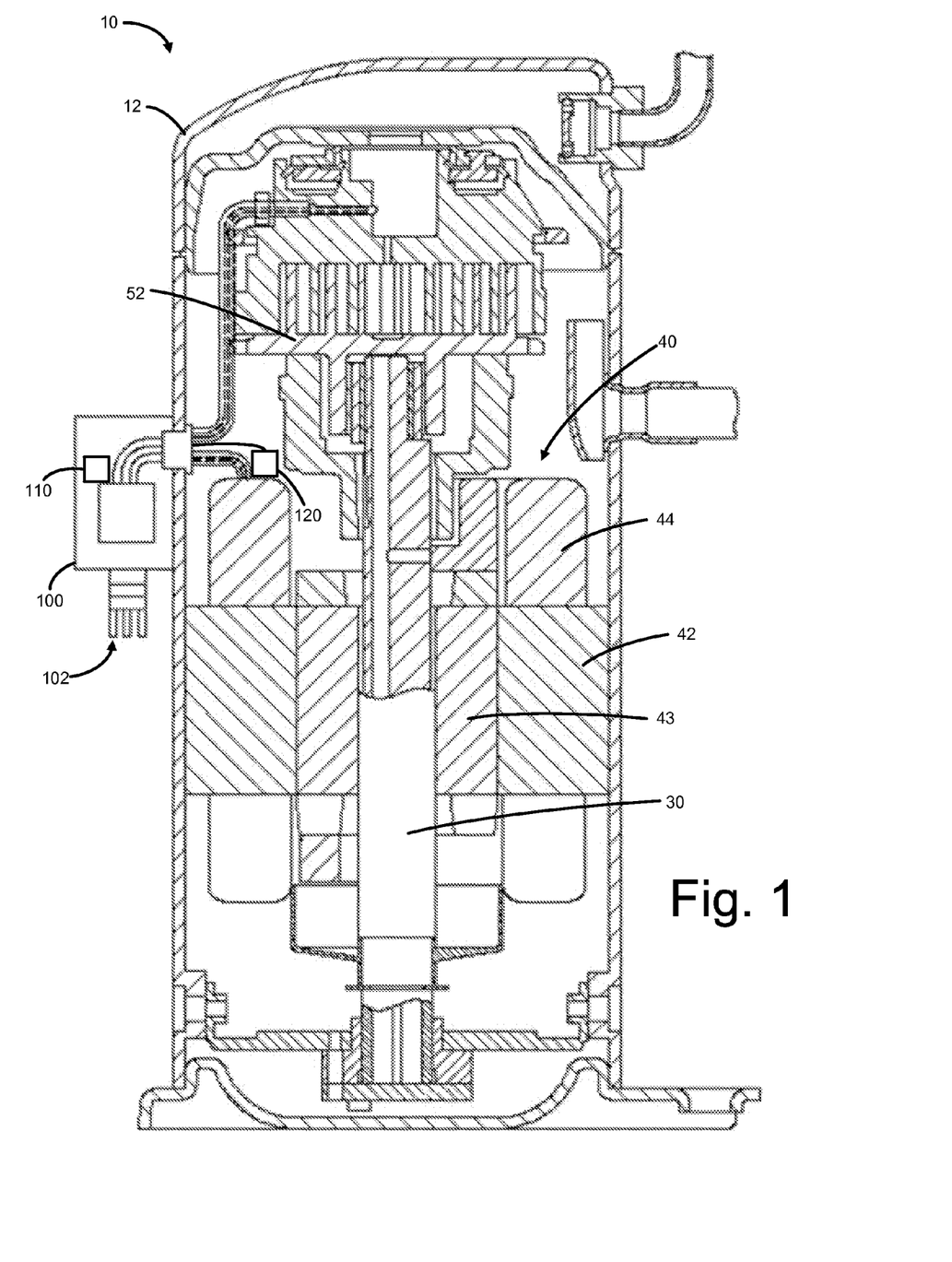
FIG. 1 is a compressor according to the present disclosure.

With reference to FIG. 1, a scroll compressor 10 includes a cylindrical shell 12 and a single phase motor 40 configured to drive an orbital scroll member 52 with a drive shaft 30. The motor 40, for example, may be a single phase induction motor. Alternatively, the motor may be a synchronous motor. Further, the motor 40 may be a poly-phase motor, such as a three-phase motor.

The motor 40 includes a stator assembly 42, windings 44 wound about the stator assembly 42, and a rotor 43 coupled to the drive shaft 30. Specifically, the windings 44 are formed by looping conducting wire about teeth within the stator assembly 42.

As described herein, the conducting wire for the windings 44 includes aluminum. Further, as used herein, aluminum should be understood to also include suitable aluminum alloys used as conducting wire to form the motor windings 44.

Figure 2:
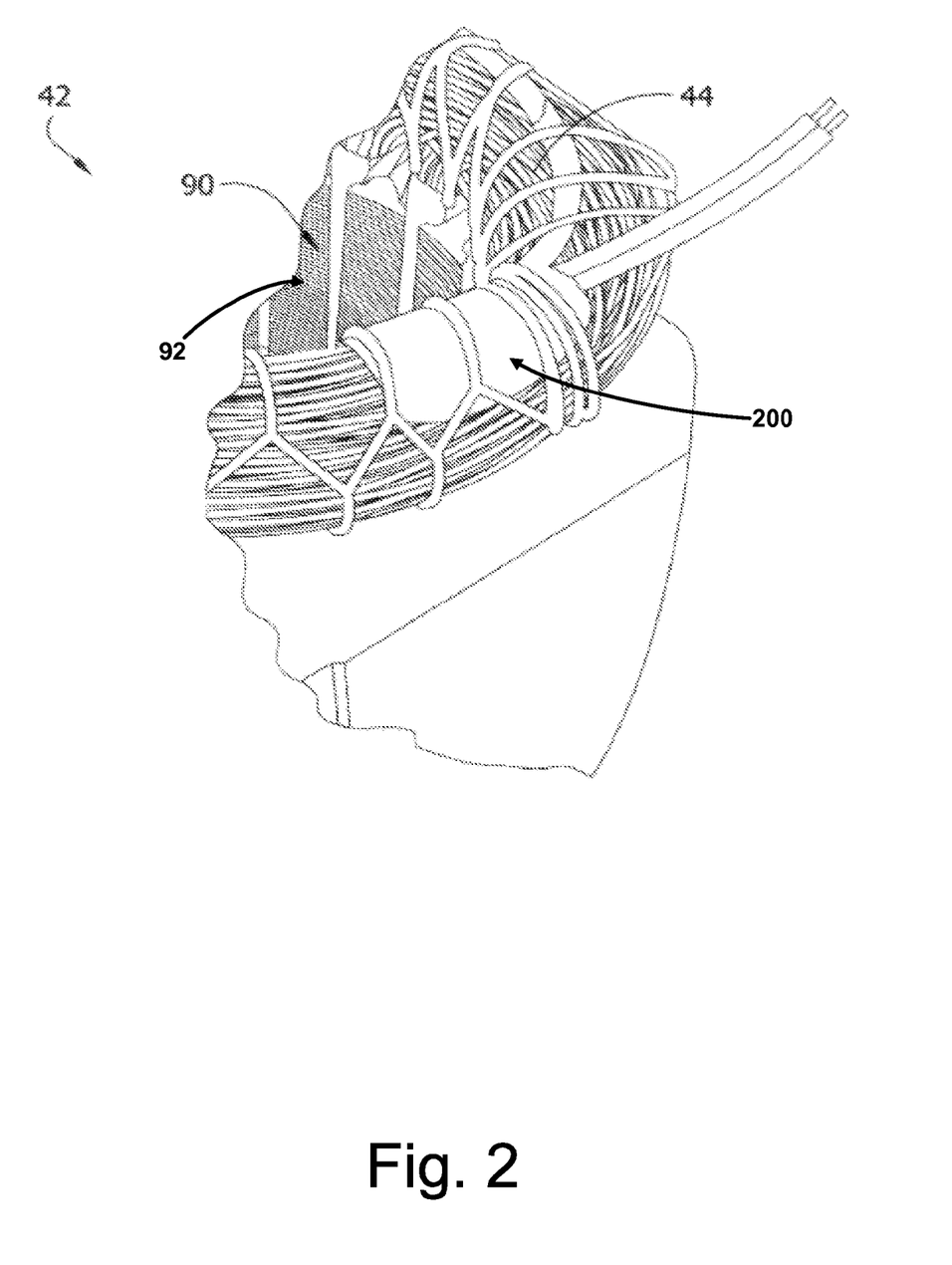
FIG. 2 is a stator assembly according to the present disclosure.

With reference to FIG. 2, stator assembly 42 includes a stator core 90 comprised of stacked laminations 92.

For further example, a scroll compressor having a single phase induction motor with aluminum windings is described in commonly assigned U.S. Patent Application No. 61/731,618, filed Nov. 30, 2012, titled Scroll Compressor Having a Single Phase Induction Motor with Aluminum Windings, and U.S. patent application Ser. No. 13/835,087, filed Mar. 15, 2013, which has the same title and claims priority to U.S. Patent Application No. 61/731,618. The entire disclosures of the above applications are incorporated by reference.

With reference again to FIG. 1, an input voltage is delivered to compressor 10 and motor 40 via a power line 102.

A control module 100 may be attached to the compressor shell 12 of the compressor 10. The power line 102 may extend through the protection module 100 to deliver the input voltage to the motor 40 within the interior of the compressor shell 12.

The control module 100 may include a voltage sensor 110 that monitors the input voltage delivered to compressor 10 and motor 40 via the power line 102. As described below, the voltage sensor 110 may be used for test purposes to determine certain voltage characteristics and parameters of the motor 40.

Additionally, as shown in FIG. 1, compressor 10 may include a temperature sensor 120 that monitors a temperature of the motor windings 44. As described below, the temperature sensor 120 may be used for test purposes to determine certain temperature characteristics and parameters of the motor 40.

Figure 6:
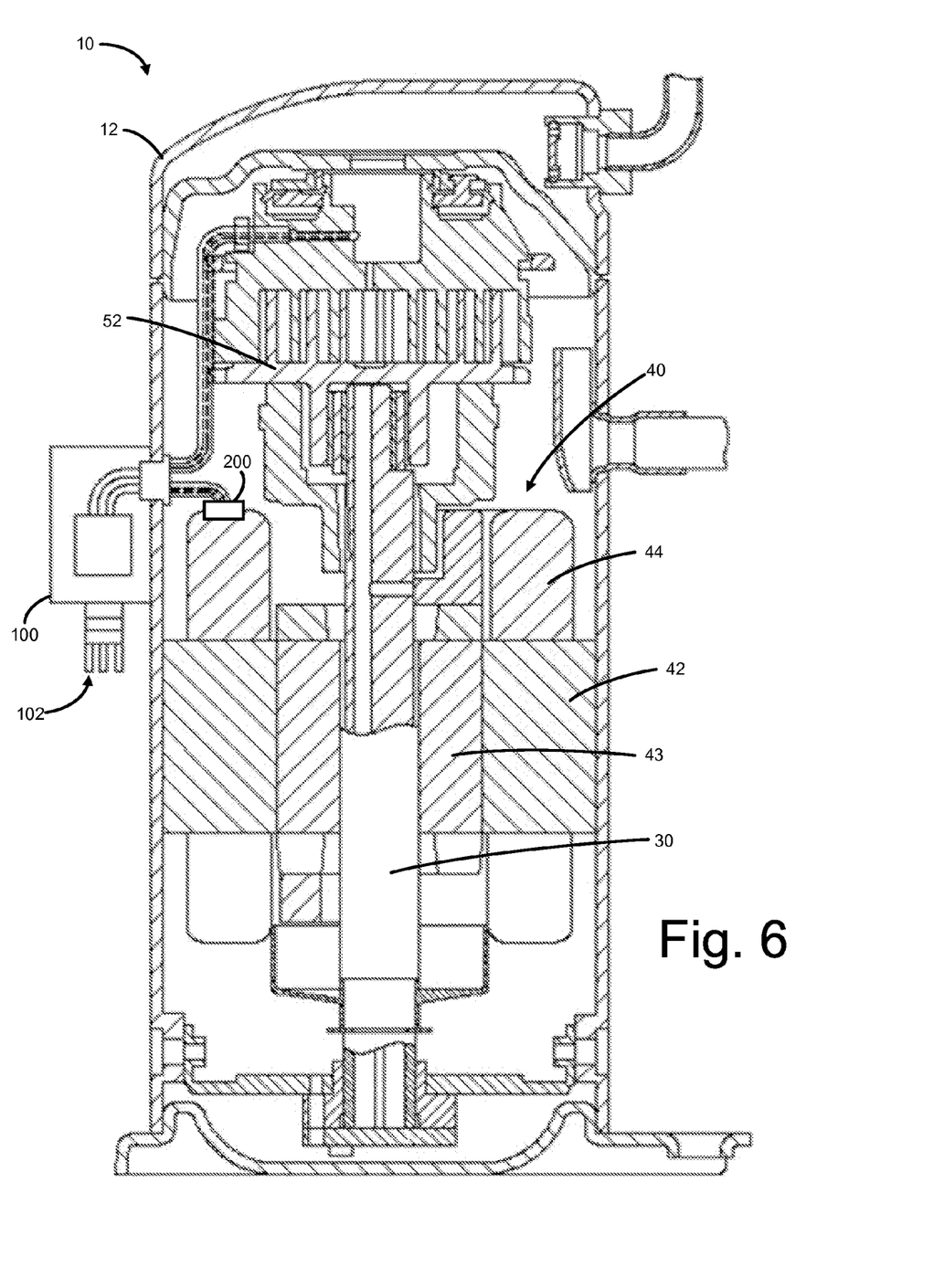
FIG. 6 is a compressor according to the present disclosure.

After testing, and as described further below, the compressor 10 may be operated without the voltage sensor 110 and temperature sensor 120. For example, a compressor 10 without the voltage sensor 110 and the temperature sensor 120 is shown in FIG. 6. As described below, the compressor shown in FIG. 6 includes a motor protector device 200, also shown in FIG. 2.

Figure 3:
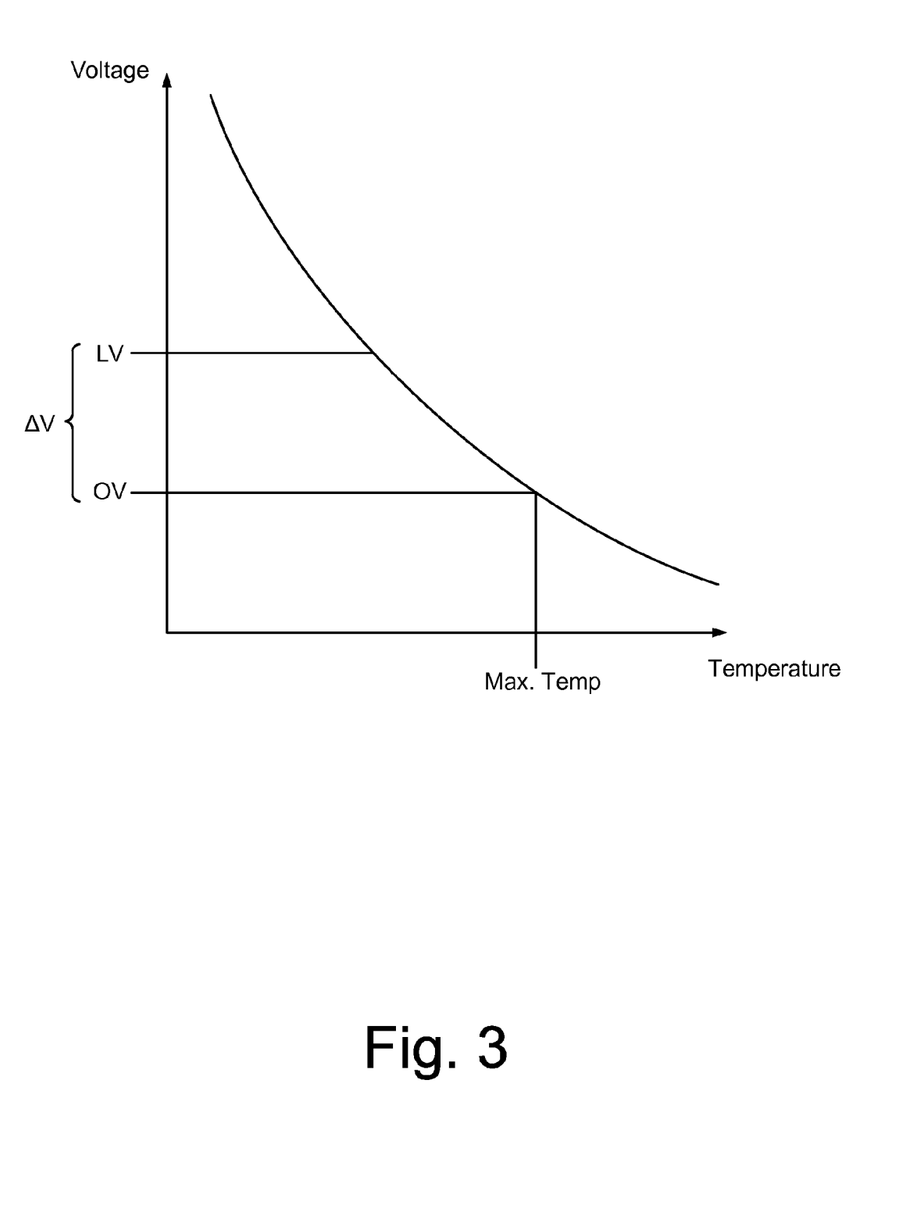
FIG. 3 is a graph illustrating voltage and temperature.

As the input voltage to the motor decreases, the temperature of electric motor tends to increase. This relationship is shown in FIG. 3. As shown, for higher voltages the motor temperature is relatively lower and for lower voltages the motor temperature is relatively higher.

Additionally, as compared with similar motors utilizing copper windings, for a given decrease in voltage, an electric motor utilizing aluminum windings will generally have a greater corresponding increase in temperature than would the similar electric motor with copper windings, with all other operating conditions being generally the same.

To account for voltage variations in the input power delivered in a given installation environment, electric motors are generally configured with a specified minimum or low voltage ("LV"), referred to as the "must run voltage" or "minimum run voltage." For example, the specification for a given manufactured electric motor may require that, to meet the specification, the electric motor must be able to operate at the specified LV. With reference to FIG. 3, LV is shown. Additionally, the LV value may be a predetermined percentage, such as 90%, of the rated voltage of the motor 40. For example, for an electric motor rated at 200V, the corresponding LV value may be 180V. In other words, LV may be 10% below the electric motor rated voltage in most cases. Other predetermined percentages, however, may be used.

For example, the following table includes the rated voltages and the "must run" or LV voltages for three different example compressor motors, including values for both 60 Hz and 50 Hz versions, where applicable:

|  | 60 Hz Rated Voltage | 60 Hz Must Run (LV) | 50 Hz Rated Voltage | 50 Hz Must Run (LV) |
|---|---|---|---|---|
| Model 1 | 208-230 V | 197 V | — | — |
| Model 2 | 265 V | 238.5 V | 220-240 V | 198 V |
| Model 3 | — | — | 220-240 V | 198 V |

Additionally, to prevent damage to the electric motor 40, a maximum temperature threshold ("Max. Temp.") for the electric motor 40 may be set or determined. The Max. Temp. may be determined, for example, based on the insulation of the electric motor 40 within the compressor 10. In other words, the Max. Temp. may be dependent upon the characteristics and capabilities of the insulation system, including the specific varnish used, the specific nylon string used, etc. For example, a Max. Temp. for the electric motor 40 installed in a given compressor may be in the range of 280 to 320 degrees Fahrenheit.

To prevent damage to the compressor 10 and the compressor motor 40, the operating temperature of the motor 40 can be maintained at a level below the Max. Temp. In other words, a protection device, such as motor protector device 200, can be implemented to cease operation of the motor before the temperature of the motor reaches the Max. Temp.

Because of the relationship between temperature and voltage, and due to the specific characteristics of the compressor, testing can be used to determine a specific voltage or approximate voltage range that corresponds to the Max. Temp. Specifically, the voltage corresponding to the Max. Temp. level may be referred to as the "overheat voltage" ("OV"). With reference to FIG. 3, OV is shown. The difference between the LV and the OV is referred to as the ΔV. For electric motors with aluminum windings, the ΔV is much smaller than the ΔV for a similar electric motor with copper windings, with all other operating conditions being generally the same.

Continuing with the example of a motor 40 with a rated operating voltage of 200V, an LV of 180V, and a Max. Temp. in the range of 280 to 320 degrees Fahrenheit, a corresponding OV for the motor 40 may be approximately 170V to 172V With reference to FIG. 4, a method 400 for determining the OV voltage level is shown and starts at 402.

Figure 4:
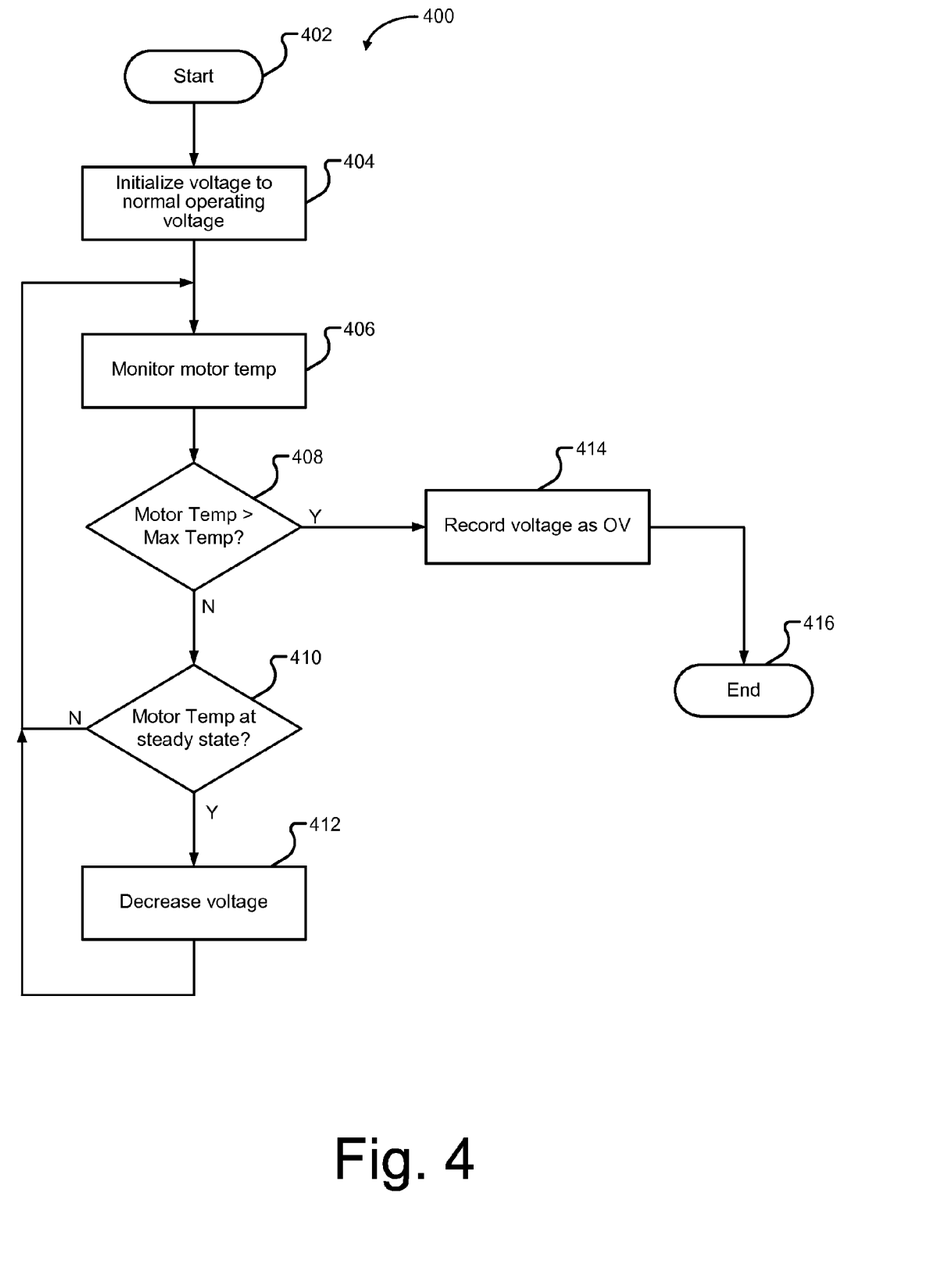
FIG. 4 is a flowchart of a method according to the present disclosure.

At an initial operating voltage for the motor 40 is selected. The initial operating voltage may be a normal voltage within the operating voltage range of the motor 40. For example, the initial operating voltage may correspond to the rated operating voltage. Continuing with the example from above, the initial operating voltage may be 200V.

At 406, the temperature of the motor is monitored with, for example, temperature sensor 120. At 408, the sensed motor temperature is compared with Max. Temp. When the sensed motor temperature is not greater than Max. Temp., the method proceeds to 410.

At 410, the method determines whether the motor temperature has reached a steady state. For example, the motor temperature reaches a steady state when it stays at or near a particular temperature for a specified period of time. At 410, when the motor temperature has not reached a steady state, the method loops back to 406 and continues to monitor the motor temperature.

At 410, when the motor temperature has reached the steady state, the method proceeds to 412. At 412, the method decreases the input voltage and proceeds to 406 to again monitor the motor temperature.

The method proceeds in this fashion until at 408 the method detects that the motor temperature is greater than Max. Temp. At 408, when the motor temperature is greater than Max. Temp., the method proceeds to 414 and the present voltage is recorded as the determined OV voltage level. The method then ends at 416. Additionally, when the motor 40 is used in the compressor 10, the compressor 10 may be operating in a maximum operating load condition during the method 400.

Figure 5:
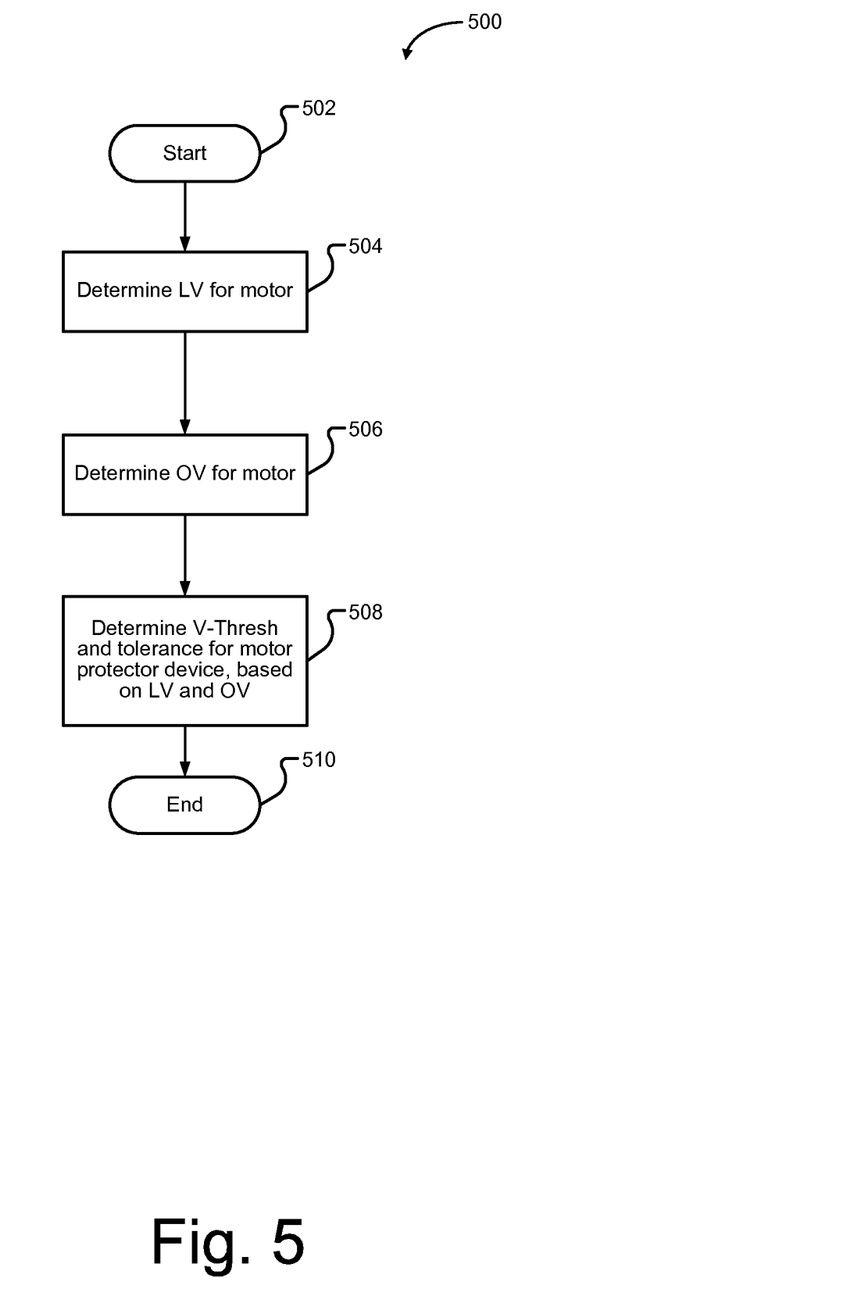
FIG. 5 is a flowchart of a method according to the present disclosure.

With reference to FIG. 5, a method 500 for determining parameter values for a motor protector device is shown and starts at 502.

At 504, the LV for the motor is determined. As discussed above, the LV level is set as part of the manufacturer's specification. As such, the LV level may be determined by reference to the manufacturer's operating specification for the motor.

At 506, the OV for the motor is determined. The OV, for example, may be determined with the method 400 described above in conjunction with FIG. 4.

Once the LV and OV levels are determined, at 508 a threshold voltage and a tolerance for a motor protector device 200 may be determined, based on the determined LV and OV levels, such that the protector device 200 appropriately ceases operation of the compressor at a threshold voltage (V-Thresh) that is between the LV and OV voltage levels. The method ends at 510.

In an electric motor 40 utilizing aluminum windings, the difference between LV and OV, i.e., the ΔV, is relatively smaller than the comparable ΔV for a similar motor with copper windings. For this reason, it can be more difficult to set the V-Thresh at an appropriate level to insure that the compressor 10 operates at the LV level, but ceases operation before the voltage decreases to the OV level. For this reason, the V-Thresh level may be set at a level that is just below the LV level, but still relatively close to the LV level. Additionally, the motor protector device 200 must have an appropriate tolerance to insure that the motor protector device 200 appropriately ceases operation of the compressor at the V-Thresh level, but allows operation at the LV level, and does not allow the voltage to decrease to the level of OV with the compressor 10 and the motor 40 still operating.

Generally, the V-Thresh level may be set to a voltage that is 4 to 8 volts lower than the LV. Continuing with the above example, for a compressor 10 and motor 40 with an LV of 180V and an OV of 170V to 172V, the V-Thresh level may be 175V to 176V, for example. Additionally, the tolerance for the protector device 200 may be 1V to 2V.

The protector device 200, as shown in FIG. 2, may be a bi-metallic strip that, based on the current flowing through the motor windings and the temperature of the motor 40, may snap open and disconnect the motor 40 from the input power line 102. In this way, the protector device 200 may be designed with appropriate materials and resistance to meet the determined V-Thresh and tolerance specifications. Because of the relatively small ΔV for a motor with aluminum windings, as compared with a motor with copper windings, the protector device 200 must be designed with appropriate V-Thresh and tolerance levels to insure that the compressor 10 and motor 40 continue to operate at the LV, but cease operating before the input voltage reaches the OV voltage level, given the relatively smaller ΔV.

As an example, the protector device 200 may be designed with a V-Thresh level that is midway between the LV level and the OV level, i.e., at the midpoint of the ΔV. Additionally, the tolerance level for the protector device 200 may be set to about 25% of the ΔV. In this way, the protector device 200 may operate to insure that the compressor 10 and motor 40 operates at the LV level and trips, or ceases operation of the compressor 10 and motor 40 at a level that is about the midpoint of the ΔV, plus or minus 25% of the ΔV. Continuing with the above example, in the case where the LV is 180V and the OV is 172V, the motor protector 200 may be designed with a V-Thresh level at 176V, and a tolerance of 2V. In this way, the motor protector 200 may trip and cease operation of the compressor at between 176V and 174V.

The method ends at 510.

As mentioned above, with reference to FIG. 6, a compressor 10 is shown with a protector device 200, implemented and designed in accordance with the present teachings. As shown, the compressor 10 of FIG. 6 does not include the voltage sensor 110 and temperature sensor 120 used for testing, as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A compressor comprising:
   a single-phase electric motor driving a compression mechanism, the electric motor having a rotor and a stator, the stator being comprised of aluminum windings; and
   a protector device, attached to the stator, configured to disconnect the electric motor from a power supply when an input voltage of the power supply to the electric motor is less than a threshold voltage value set at a level between a minimum run voltage and an overheat voltage of the compressor, the overheat voltage corresponding to an overheat temperature of the electric motor;
   wherein the threshold voltage value is set at a level that is between the minimum run voltage and the overheat voltage and wherein the protector device includes a tolerance level such that the threshold voltage minus the tolerance level is greater than the overheat voltage and such that the threshold voltage plus the tolerance level is less than the minimum run voltage.

2. The compressor of claim 1, wherein the threshold voltage value is set at a midpoint between the minimum run voltage and the threshold voltage.

3. The compressor of claim 2, wherein the tolerance level is set at a value that is 25% of the difference between the minimum run voltage and the overheat voltage.

4. The compressor of claim 1, wherein the tolerance level is set at a value that is 25% of the difference between the minimum run voltage and the overheat voltage.

5. The compressor of claim 1, wherein the compressor is a scroll compressor.

6. A method comprising:
   driving a compression mechanism with a single-phase electric motor having a rotor and a stator, the stator being comprised of aluminum windings; and
   disconnecting the electric motor from a power supply with a protector device when an input voltage of the power supply to the electric motor is less than a threshold voltage value set at a level between a minimum run voltage and an overheat voltage of the compressor, the overheat voltage corresponding to an overheat temperature of the electric motor;
   wherein the threshold voltage value is set at a level that is between the minimum run voltage and the overheat voltage and wherein the protector device includes a tolerance level such that the threshold voltage minus the tolerance level is greater than the overheat voltage and such that the threshold voltage plus the tolerance level is less than the minimum run voltage.

7. The method of claim 6, wherein the threshold voltage value is set at a midpoint between the minimum run voltage and the threshold voltage.

8. The method of claim 7, wherein the tolerance level is set at a value that is 25% of the difference between the minimum run voltage and the overheat voltage.

9. The method of claim 6, wherein the tolerance level is set at a value that is 25% of the difference between the minimum run voltage and the overheat voltage.

10. The method of claim 6, wherein the compressor is a scroll compressor.

11. An apparatus comprising:
    a protector device configured for attachment to a stator of a single-phase electric motor that drives a compression mechanism of a compressor, the electric motor having a rotor and the stator being comprised of aluminum windings, the protector device also being configured to disconnect the electric motor from a power supply when an input voltage of the power supply to the electric motor is less than a threshold voltage value set at a level between a minimum run voltage and an overheat voltage of the compressor, the overheat voltage corresponding to an overheat temperature of the electric motor;
    wherein the threshold voltage value is set at a level that is between the minimum run voltage and the overheat voltage and wherein the protector device includes a tolerance level such that the threshold voltage minus the tolerance level is greater than the overheat voltage and such that the threshold voltage plus the tolerance level is less than the minimum run voltage.

12. The apparatus of claim 11, wherein the threshold voltage value is set at a midpoint between the minimum run voltage and the threshold voltage.

13. The apparatus of claim 12, wherein the tolerance level is set at a value that is 25% of the difference between the minimum run voltage and the overheat voltage.

14. The apparatus of claim 11, wherein the tolerance level is set at a value that is 25% of the difference between the minimum run voltage and the overheat voltage.

15. The apparatus of claim 11, wherein the compressor is a scroll compressor.

* * * * *